United States Patent
Zhu et al.

(10) Patent No.: US 9,954,587 B2
(45) Date of Patent: Apr. 24, 2018

(54) MULTIPLE-INPUT MULTIPLE-OUTPUT CELLULAR NETWORK COMMUNICATIONS

(71) Applicants: Yuan Zhu, Beijing (CN); Qinghua Li, San Ramon, CA (US); Xiaogang Chen, Beijing (CN); Hooman Shirani-Mehr, Portland, OR (US)

(72) Inventors: Yuan Zhu, Beijing (CN); Qinghua Li, San Ramon, CA (US); Xiaogang Chen, Beijing (CN); Hooman Shirani-Mehr, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 5 days.

(21) Appl. No.: 14/784,257

(22) PCT Filed: Mar. 27, 2014

(86) PCT No.: PCT/US2014/031972
§ 371 (c)(1),
(2) Date: Oct. 13, 2015

(87) PCT Pub. No.: WO2014/182383
PCT Pub. Date: Nov. 13, 2014

(65) Prior Publication Data
US 2016/0065290 A1    Mar. 3, 2016

Related U.S. Application Data

(60) Provisional application No. 61/821,635, filed on May 9, 2013.

(51) Int. Cl.
H04B 7/0417    (2017.01)
H04W 52/02    (2009.01)
(Continued)

(52) U.S. Cl.
CPC .......... *H04B 7/0417* (2013.01); *H04L 5/0053* (2013.01); *H04L 27/0008* (2013.01);
(Continued)

(58) Field of Classification Search
CPC .... H04B 7/0626; H04B 7/0404; H04B 7/063; H04B 7/0619; H04B 7/0632;
(Continued)

(56) References Cited

U.S. PATENT DOCUMENTS 6,232,921 B1 *   5/2001   Aiken ................. H04B 7/0615
                                                        342/383
6,487,416 B1   11/2002   Bundy
(Continued)

FOREIGN PATENT DOCUMENTS

EP    2549790 A1    1/2013
EP    2555445 A1    2/2013
(Continued)

OTHER PUBLICATIONS

3GPP TS 36.214 v11.1.0; 3rd Generation Partnership Project; Technical Specification Group Radio Access Network; Evolved Universal Terrestrial Radio Access (E-UTRA); Physical layer; Measurements; Dec. 2012; 14 pages; Release 11.
(Continued)

*Primary Examiner* — Hassan Kizou
*Assistant Examiner* — Roberta A Shand
(74) *Attorney, Agent, or Firm* — Thorpe North & Western

(57) ABSTRACT

A technology for an enhanced node B (eNB) that is operable to perform beamforming using multiple-input multiple-output (MIMO) in a cellular network. One or more user equipment (UEs) can be configured to use a same or different multiple port (multi-port) channel state information reference signal (CSI-RS) pattern. Feedback reports can be received from the one or more UEs associated with the
(Continued)

multi-port CSI-RS pattern at the eNB. A UE-specific or more UEs at the eNB using the feedback report from the one or more UEs.

28 Claims, 11 Drawing Sheets

(51) Int. Cl.
| | |
|---|---|
| H04L 12/26 | (2006.01) |
| H04W 4/00 | (2018.01) |
| H04W 76/02 | (2009.01) |
| H04L 5/00 | (2006.01) |
| H04W 72/04 | (2009.01) |
| H04W 72/12 | (2009.01) |
| H04W 24/02 | (2009.01) |
| H04W 72/10 | (2009.01) |
| H04W 12/04 | (2009.01) |
| H04L 27/00 | (2006.01) |
| H04W 88/02 | (2009.01) |
| H04L 27/36 | (2006.01) |

(52) U.S. Cl.
CPC ............ *H04L 43/16* (2013.01); *H04W 4/005* (2013.01); *H04W 12/04* (2013.01); *H04W 24/02* (2013.01); *H04W 52/0209* (2013.01); *H04W 52/0216* (2013.01); *H04W 52/0229* (2013.01); *H04W 52/0235* (2013.01); *H04W 72/0406* (2013.01); *H04W 72/0413* (2013.01); *H04W 72/0453* (2013.01); *H04W 72/10* (2013.01); *H04W 72/12* (2013.01); *H04W 76/02* (2013.01); *H04W 76/023* (2013.01); *H04L 5/006* (2013.01); *H04L 27/362* (2013.01); *H04W 88/02* (2013.01); *Y02B 60/50* (2013.01)

(58) Field of Classification Search
CPC .. H04B 7/0421; H04B 7/0413; H04B 7/0417; H04B 7/0452; H04W 16/32; H04W 24/10
See application file for complete search history.

(56) References Cited

U.S. PATENT DOCUMENTS

| | | | | |
|---|---|---|---|---|
| 8,693,971 | B1* | 4/2014 | Balraj | H04B 7/0417 |
| | | | | 375/216 |
| 8,942,302 | B2* | 1/2015 | Krishnamurthy | H04B 7/0469 |
| | | | | 370/252 |
| 2006/0258295 | A1 | 11/2006 | Wong | |
| 2011/0103504 | A1 | 5/2011 | Ma | |
| 2011/0300871 | A1 | 12/2011 | Dottling | |
| 2012/0134273 | A1* | 5/2012 | Bhattad | H04L 5/0048 |
| | | | | 370/241 |
| 2012/0195286 | A1 | 8/2012 | Kim | |
| 2012/0257515 | A1 | 10/2012 | Hugl et al. | |
| 2012/0287799 | A1* | 11/2012 | Chen | H04B 7/024 |
| | | | | 370/252 |
| 2013/0040682 | A1 | 2/2013 | Chang et al. | |
| 2013/0196675 | A1* | 8/2013 | Xiao | H04W 72/082 |
| | | | | 455/452.1 |
| 2013/0242778 | A1* | 9/2013 | Geirhofer | H04L 1/0026 |
| | | | | 370/252 |
| 2013/0301450 | A1 | 11/2013 | Geirhofer | |
| 2014/0211731 | A1 | 7/2014 | Inoue | |
| 2014/0241198 | A1 | 8/2014 | Sun | |
| 2015/0105025 | A1* | 4/2015 | Zhang | H01Q 3/26 |
| | | | | 455/63.4 |
| 2016/0021621 | A1 | 1/2016 | Wu | |
| 2016/0080061 | A1 | 3/2016 | Yamg | |

FOREIGN PATENT DOCUMENTS

| | | |
|---|---|---|
| EP | 2579638 A1 | 4/2013 |
| EP | 2747304 A1 | 6/2014 |
| WO | WO 2012/157870 A2 | 11/2012 |
| WO | WO 2013/024852 A1 | 2/2013 |
| WO | WO 2013/025558 A1 | 2/2013 |
| WO | WO 2013/064897 A1 | 5/2013 |
| WO | WO 2014/182383 A1 | 11/2014 |

OTHER PUBLICATIONS

Alcatel-Lucent Shanghai Bell et al., 'Considerations on CSI feedback enhancements for high-priority antenna configurations', R1-112420, 3GPP TSG-RAN WGI #66, Athens, Greece, Aug. 22-26, 2011.

NTT DOCOMO et al., 'CSI RS Configuration to Support 4 Tx MIMO UE in 8 Tx Networks', R1-110861, 3GPP TSG-RAN WGI #64, Taipei, Taiwan, Feb. 21-25, 2011.

Renesas Mobile Europe Ltd., 'CoMP Resource Management Set Configuration', RI-122355, 3GPP TSG-RAN WGI Meeting #69, Prague, Czech Republic, May 21-25, 2012.

Samsung, 'CoMP RRC Parameters', R1-122243, 3GPP TSG RAN WGI #69, Prague, Czech Republic, May 21-25, 2012.

Search Report for European Application No. 14829148.7 filed Jul. 21, 2014, (dated Feb. 13, 2017), 9 pages.

* cited by examiner

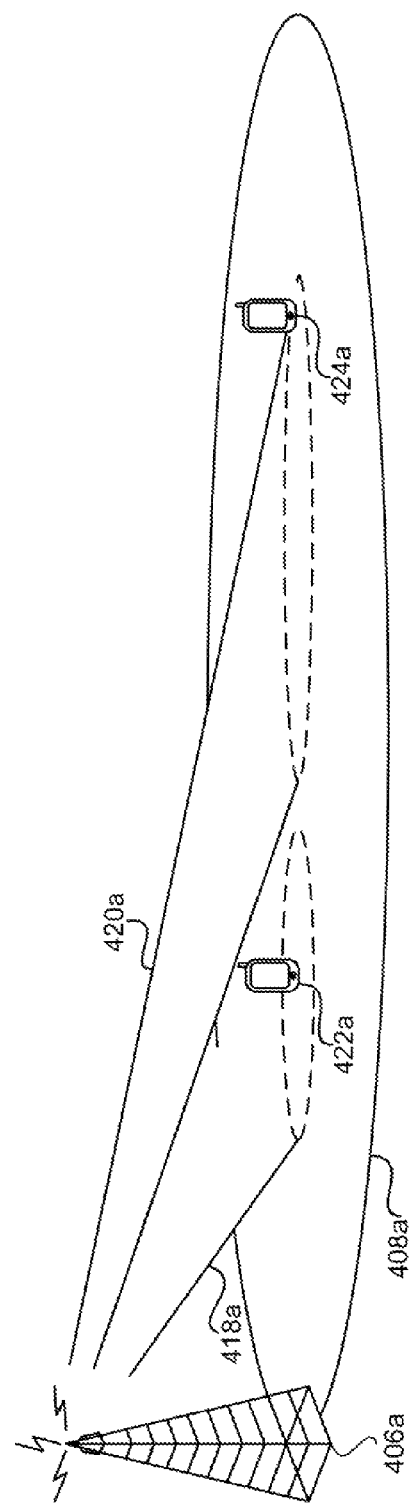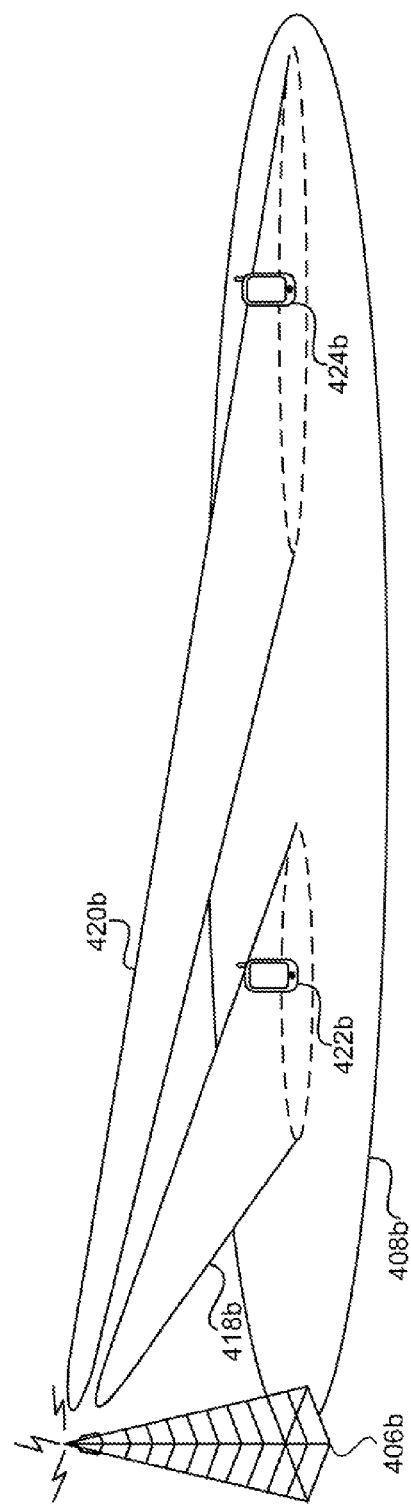

MULTIPLE-INPUT MULTIPLE-OUTPUT CELLULAR NETWORK COMMUNICATIONS

RELATED APPLICATIONS

This application claims the benefit of and hereby incorporates by reference U.S. Provisional Patent Application Ser. No. 61/821,635, filed May 9, 2013.

BACKGROUND

Increased use of mobile devices, such as smartphones and tablets, with an expanding number of wireless services offered on the devices, such as streaming video, have placed increased data loads and throughput requirements on wireless networks. To handle the increasing amount of wireless services to an increasing numbers of users, various multiple antenna techniques can be employed in wireless network environments to meet the increasing data and throughput demands.

One multiple antenna technique to meet increasing data and throughput demands is beamforming. Beamforming is a signal processing technique used to control the directionality of the reception or transmission of a signal on a transducer array. While, conventional multiple antenna techniques, such as beamforming, offer an improved receiver and/or transmit gain or loss compared with omnidirectional reception, conventional multiple antenna techniques are insufficient for dynamic antenna systems.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4A illustrates constructing a UE-specific cell for multiple UEs in accordance with an example;

FIG. 4B illustrates constructing another UE-specific cell for multiple UEs in accordance with an example;

Figure 1:
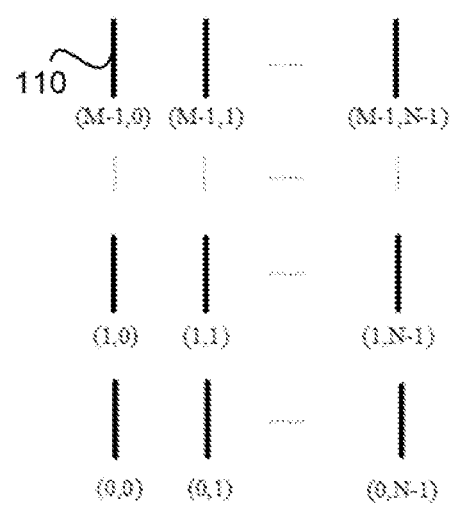
FIG. 1 illustrates a 2D antenna array in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Multiple antenna techniques can be used to achieve advantages such as diversity gain, array gain, and spatial multiplexing gain. A multiple-input multiple-output (MIMO) system uses multiple antennas at a transmitter and/or receiver to improve communication performance. A conventional MIMO system can perform beamforming in two dimensions. Beam coverage by a transmission point, such as an enhanced node B (eNB) or base station in a cellular network, can be dynamically shaped by beamforming of a number of antennas at the transmission point. By adapting the beam coverage, eNBs can optimize signal quality and handover. In conventional MIMO systems, a user equipment (UE) that uses reference signal (RS) has a fixed vertical transmission. Because the reference signal has a fixed vertical transmission, each RS port is not visible for vertical beamforming and the UE cannot communicate information to enable vertical precoding. In legacy LTE systems, a UE measures a reference signal receive power (RSRP) and/or a reference signal received quality (RSRQ) to assist the eNB to make a cell association decision. RSRP is the linear average over power contributions of resource elements that carry cell-specific reference signals within a considered measurement frequency bandwidth. In one embodiment, the reference point for an RSRP measurement can be an antenna connector of a UE.

Figure 2:
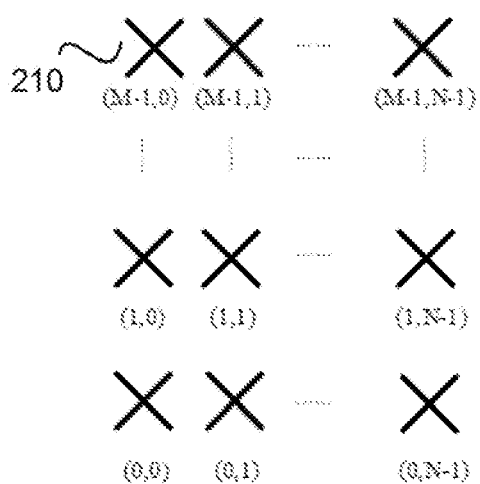
FIG. 2 illustrates a 2D antenna array with cross polarized antennas in accordance with an example.

A dynamic antenna system, such as a three dimensional (3D) MIMO or a full dimensional (FD) MIMO, can perform beamforming in horizontal and vertical dimensions using two dimensional (2D) antenna arrays. FIG. 1 depicts a 2D antenna array 100 with N columns and M antenna elements 110 per column, where N and M are defined numbers. Each row in this example is a uniform linear array with N antenna elements 110. FIG. 2 depicts a 2D antenna array 200 with N columns and M antenna elements 210 per column. Each column has cross polarized antennas with 2N antennas. The example of FIG. 1 is not intended to be limiting. Other two dimensional antenna array configurations can be used to perform 3D or FD MIMO. The terms 3D MIMO and FD MIMO are used synonymously throughout this application.

In one embodiment, a 3D MIMO or FD MIMO system performs beamforming in a closed-loop system. 3D MIMO or FD MIMO beamforming in horizontal and vertical dimensions uses a plurality of antennas in an antenna array. In one embodiment, 3D MIMO or FD MIMO beamforming can be performed at an enhanced node B (eNB) or base station of a cellular network and enables the coverage of a beam of the eNB or base station to be dynamically shaped over the X, Y, and Z axes. In one example, vertical beamforming or antenna tilting can extend or shrink a beam coverage angle in a vertical dimension. In another example, horizontal beamforming can change a beam coverage angle in a horizontal dimension. By adapting the beam coverages, an eNB can optimize signal quality and handover. The cellular communications system can comprise of one or more cellular network nodes or cells and one or more Institute of Electrical and Electronics Engineers (IEEE) 802.11-2012 configured access points. In one embodiment, the one or more cellular networks may be 3rd generation partnership project (3GPP) long term evolution (LTE) Rel. 8, 9, 10, 11, or 12 networks and/or an IEEE 802.16p, 802.16n, 802.16m-2011, 802.16h-2010, 802.16j-2009, or 802.16-2009 configured network.

For the dynamic antenna system, an eNB can make multiple antenna ports visible to a UE by configuring the UE with a multi-port channel state information reference signal (CSI-RS) pattern. In one embodiment, the CSI-RS pattern can convey vertical channel information, such as the channel of one column of antennas (antenna column) in the 2D antenna array. In another embodiment, the CSI-RS pattern can convey horizontal channel information. In one embodiment, each CSI-RS horizontal pattern can be configured to assume that the vertical value is already determined. When the CSI-RS pattern has been determined the UE can perform CSI based measurements. The CSI based measurements can include a channel quality indication (CQI), a precoding matrix indicator (PMI), and a rank indicator. In one embodiment, after the UE has performed CSI based measurements, the UE can then transmit data to other devices in the cellular network.

In one embodiment, the UE can reuse a closed-loop beamforming feedback operation to report a beamformed RSRP from a multi-port CSI-RS pattern. In one embodiment, the closed-loop system does not rely on just one antenna port. For example, if there are two antenna ports and 8 antennas, then the closed-loop system can perform 2×8 measurements.

In one embodiment, for closed-looped beamforming, the UE presumes what the single code book is. For one CSI-RS system, there can be multiple hypothetical RSRP reports. The UE can transmit the strongest hypothetical RSRP measurement to an eNB. In one embodiment, a closed-loop beamforming operation uses a transmission mode 4 (TM4). In one embodiment of the closed-loop system, the UE can report a CSI to the eNB and the eNB will apply a precoder to the CSI, resulting in a high spectrum efficiency. In one embodiment, the eNB configures a UE with a multi-port CSI-RS pattern to perform a RSRP and/or RSRQ measurement and the RSRP and/or RSRQ is measured by the UE using a selected precoder. In one embodiment, the precoder is known by both eNB and UE through the codebook. The eNB can use a closed-loop beamforming technique to create a virtual UE-specific cell according to the feedbacks from the UEs. Namely, the eNB can create virtual cell(s) using the multiple RSRP reports from one or more of the UEs.

Figure 3A:
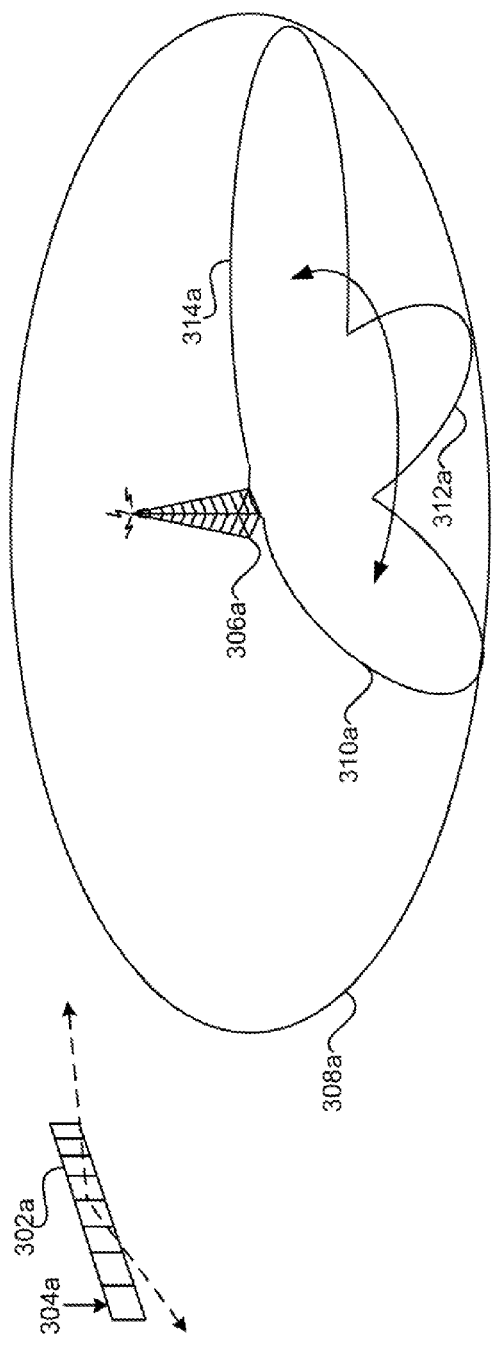
FIG. 3A depicts a cellular network comprising of an eNB with a one dimensional antenna array in accordance with an example.

FIG. 3A depicts a cellular network comprising an eNB with a one dimensional antenna array 302a. The one dimensional antenna array 302a is further comprised of antenna elements 304. A selected number of antenna elements 304a can be associated with one or more antenna ports. The number of antenna elements in an antenna array can vary. For example, an antenna column in an antenna array can include 2, 4, 8 or more antenna elements. FIG. 3A shows a cellular network comprising a base station or eNB 306a and its corresponding coverage area 308a. FIG. 3A also illustrates the horizontal directionality that the antenna array 302a can create for a beam of an eNB for two dimensional beamforming. The horizontal directivity provided by the antenna array 302a is depicted by different beam direction geometries 310a, 312a, and 314a.

Figure 3B:
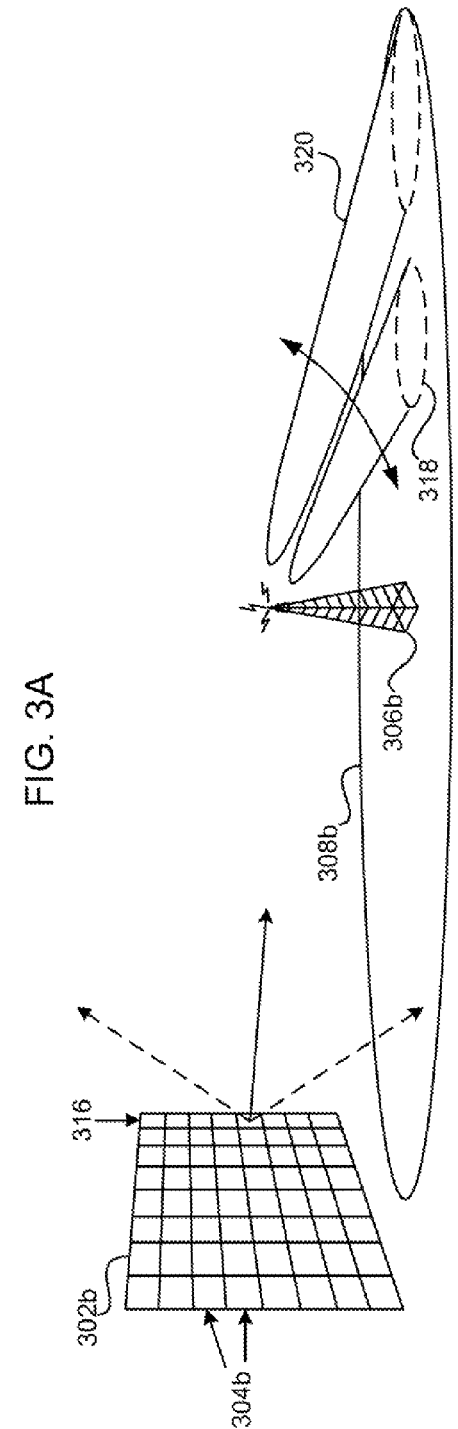
FIG. 3B depicts another cellular network comprising of an eNB with a one dimensional antenna array in accordance with an example.

FIG. 3B depicts a cellular network comprised of an eNB with a two dimensional (2D) antenna array 302b. The 2D antenna array 302b comprises a set of antenna elements 304b. In one embodiment, each antenna element 304b is mapped to a different antenna port. In one example, MIMO in a 3GPP LTE network can be configured to only support up to 8 antenna ports. In this example, where the antenna array 302b is mapped to 64 antenna ports, e.g. 64 antenna elements 304b, the number of antenna ports in the antenna array 302b exceeds the maximum 8 antenna ports that MIMO is configured to support.

In one embodiment, the antenna elements 304b can be combined into a virtual antenna, corresponding to a single antenna port. For example, each row or column can correspond to a single virtual antenna port, such as an antenna column 316. In another embodiment, a virtual antenna port can be comprised of any combination of antenna elements. FIG. 3B shows a cellular network comprising a base station or eNB 306b and its corresponding coverage area 308b. FIG. 3B also illustrates an example of the vertical directionality that the antenna array 302b can create a beam for an eNB to provide three dimensional or full dimension beam forming. The vertical directivity provided by the antenna array 302b is depicted by different beam direction geometries 318 and 320. In another embodiment, antenna array 302b can adjust the horizontal directionality of the beam of an eNB. Both the vertical and horizontal directivity can be used to change a width or height of the beam.

FIGS. 4A and 4B illustrate constructing UE-specific cells for multiple UEs. FIG. 4A depicts a cellular network that includes an eNB 406a with a cell coverage area 408a. The eNB can include a 2D antenna array configured to provide coverage for multiple UEs 422a and 424a. The 2D antenna array at the eNB can be employed to configure beam configurations. Example beam configurations include 418a and 420a. Beam configuration 418a is directed to an area where UE 422a is located. Beam configuration 418a is configured to provide optimal power and signal quality to UE 422a. Beam configuration 420a is directed to an area where UE 424a is located. However, UE 424a is located at the edge of beam configuration 420a. Because UE 420a is at the edge of beam configuration 424a, UE 424a may receive suboptimal power and signal quality.

In one example, UEs 422a and 424a can be configured to receive CSI-RS from the eNB. The CSI-RS can be configured to provide information for multiple vertical beam configurations, such as beam configuration 418a and beam configuration 420a in FIG. 4A. In this example, UEs 422a and 424a can communicate a feedback report to the eNB 406a to enable the eNB to construct UE-specific cells based on the feedback reports received from the UEs. The feedback reports may include RSRP messages and/or RSRQ messages.

FIG. 4B depicts UE-specific cells constructed by the eNB 406b for UEs 422b and 424b based on the feedback reports from UEs 422b and 424b. In one embodiment, the phases of one or more antenna elements or antenna arrays can be adjusted to provide vertical and/or horizontal movement of the beam in relation to UEs 422*b* and 424*b*. Movement of the beam relative to the location of the UE can be used to provide optimal cell power and signal quality for UEs 422*a* and 424*b*. In one embodiment, to construct the UE-specific cells 422*b* and 424*b*, an iterative process can be used whereby one or more UEs within cellular network provide feedback reports to the eNB. The iterative process can continue until one or more beam configurations are optimized with respect to the relevant UE.

Figure 5:
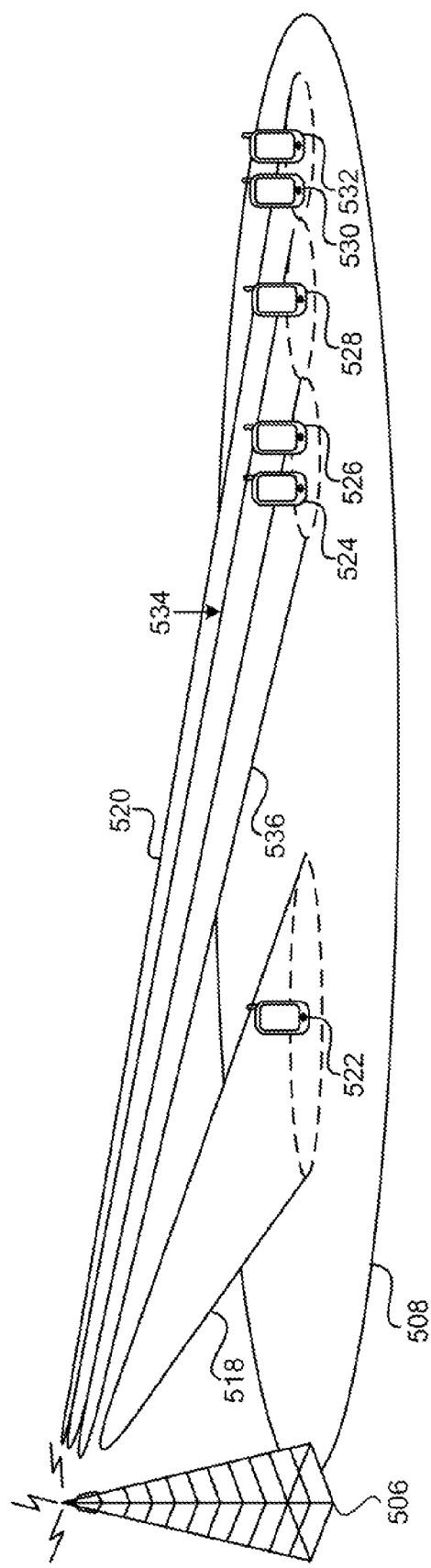
FIG. 5 illustrates constructing a UE-specific cell for multiple UEs in accordance with an example.

Similar to FIG. 4, FIG. 5 illustrates constructing UE-specific cells and group UE-specific cells for multiple UEs. FIG. 5 depicts multiple UEs 522, 524, 526, 528, 530, and 532 within a cellular network. FIG. 5 illustrates that the eNB 506 can construct a UE specific cell for a single UE and/or construct a group UE-specific cells for multiple UEs, such as UEs 524 and 526 or UEs 530 and 532. FIG. 5 is substantially similar to FIG. 4 in other regards.

Figure 6:
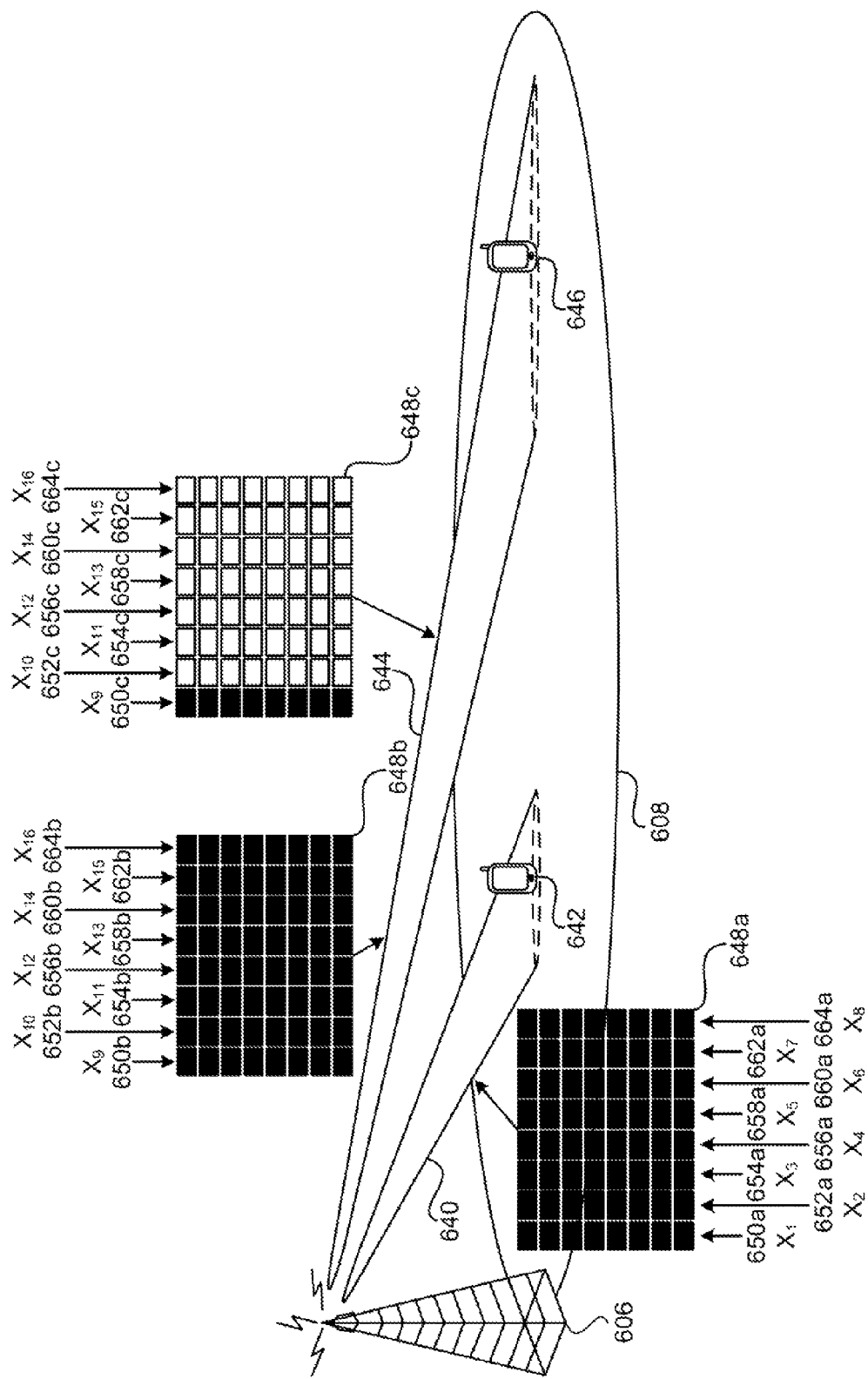
FIG. 6 illustrates different antenna array configurations for a 2D antenna array in accordance with an example.

FIG. 6 illustrates different antenna array configurations 648*a*, 648*b*, and 648*c* for the 2D antenna array used by eNB 606. In one embodiment, an eNB can adjust antenna array configurations by changing the number of antenna ports or beam weights based on a feedback report from one or more UEs. In one embodiment, a virtual antenna can correspond to an antenna port. In another embodiment, multiple antenna elements can be combined to form a virtual antenna port or an antenna port. The multiple antenna elements of the virtual antenna port or antenna port can appear to a UE as a single antenna. Any combination of antenna elements can be combined to form a virtual antenna port or an antenna port. In one example, 2D antenna array 648*a* comprises antenna ports 650*a*-664*a*, e.g., $X_1$-$X_8$. The antenna ports 650*a*-664*a* are used to form beam configuration 648*a*. The beam configuration 648*a* is used to provide a beam 640 to form a UE specific cell for UE 642. In another example, antenna ports can include one or more columns of antenna elements, one or more rows of antenna elements, portions of one or more rows of antenna elements, portions of one or more columns of antenna elements, all columns or rows of antenna elements, or any other combination.

In another example, the same antenna elements of antenna ports 650*a*-664*a* can be reused to create different antenna ports 650*b*-664*b* that are configured differently for beam configuration 648*b* for UE 646. The beam configuration 648*b* is used to provide a beam 644 to UE 646. For example, the eight antenna columns 650*b*-664*b* of the 2D antenna array can have a different electrical tilting to create eight additional antenna ports, namely, $X_9$-$X_{16}$ for the beam configuration 648*b*. In one embodiment, the beam configurations 648*a* and 648*b* can be used simultaneously by the eNB 606 for UEs 646 and 648. In another example, the antenna elements of antenna port 650*c* can be used to create a different beam configuration 648*c* for UE 646. The beam configuration 648*c* can be used to provide a beam 644 to UE 646. In this example only antenna column 650*c* of the antenna array is used to form the beam configuration 648*c* for UE 646.

In one embodiment, a desired radiation pattern or beam configuration is constructed to form a UE-specific or group UE-specific cell. In one embodiment, a desired radiation pattern can be formed by changing the phase, amplitude, and number of antenna elements used in the virtual antenna port or antenna port. In another embodiment, a desired radiation pattern can be formed by changing an electrical tilting level of the virtual antenna port or antenna port and/or by adjusting the beamforming weights of one or more antenna elements of the antenna virtual antenna port or antenna port.

Figure 7:
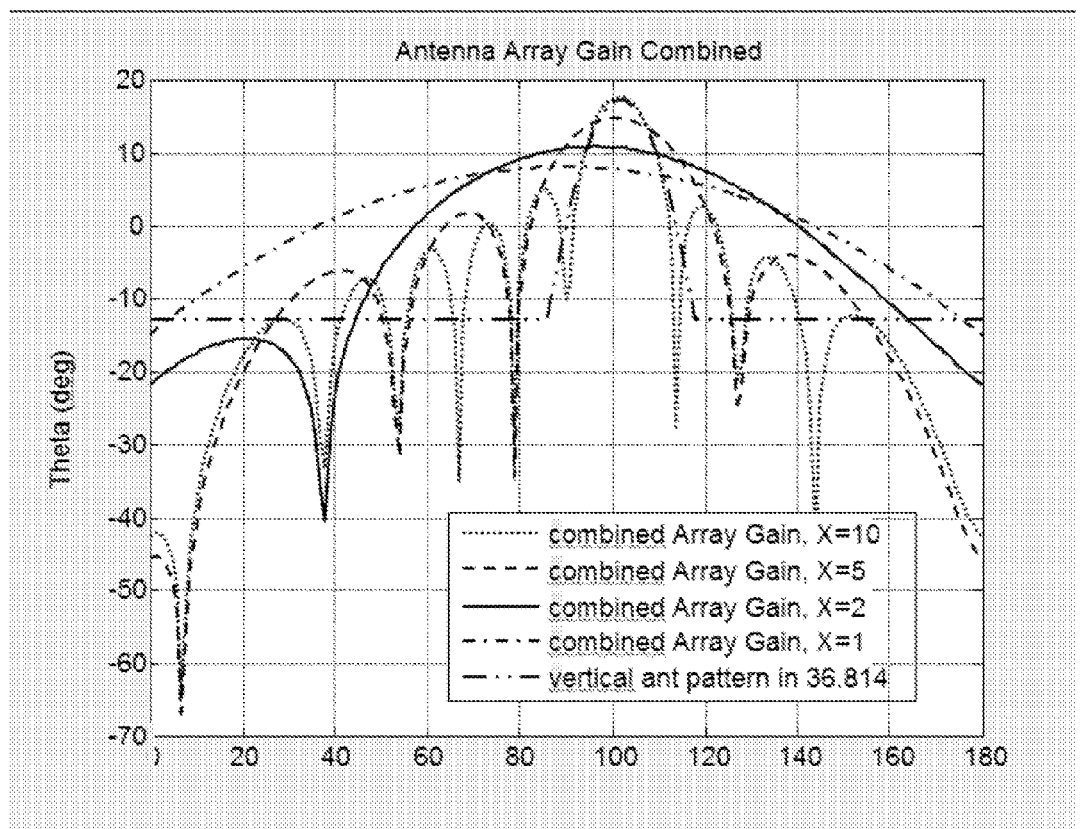
FIG. 7 illustrates a table of combined array gains with the same electrical tilting and different numbers of antenna elements per antenna port in accordance with an example.

FIG. 7 illustrates a combined array gain with the same electrical tilting and different numbers of antenna elements X per antenna port.

FIG. 7 further illustrates a radiation pattern of the antenna ports for beamforming weights discussed in the proceeding paragraphs. When X antenna elements ($1 \leq X \leq M$) are weighted with the same polarization in one column to form one antenna port, the radiation pattern of that antenna port for beamforming weights is: $W=[w_1, w_2, \ldots, w_X]^T$ and $$\omega_n = \frac{1}{\sqrt{X}} \exp\left(2\pi \cdot i \cdot (n-1) \cdot \frac{d_v}{\lambda} \cdot \cos(\theta_{etilt})\right),$$

n=1, 2, . . . x, where W is a beamforming vector which is used to create one virtual antenna port, w is a beamforming weight applied on each antenna element, T is a transpose operation, X is a number of antennas elements mapped to one antenna port, n is an index of an antenna element to map an antenna port, l is an antenna port index for a beamformed multi-port CSI-RS pattern, $Q_X$ is a number of antenna ports in the multi-port CSI-RS pattern, $d_v$ is a vertical antenna element spacing, $\lambda$ is a wavelength, and $\theta_{etilt}$ is an electrical downtilt.

FIG. 7 also illustrates that increasing the number of antenna elements can reduce the main lobe width and creates more nulls. In one embodiment, an eNB may limit a UE to generate beamforming or weight feedbacks for a designated number of antennas. In another embodiment, an eNB can allow the UE to select an antenna number and generate the beamforming feedback for the selected antenna number. In one embodiment, a UE that is capable of varying the number of antennas can receive a better coverage than a UE with a fixed number of antennas.

In one embodiment, by performing channel measurement of a CSI-RS pattern from one transmission point or antenna port, a UE can derive a channel matrix H having a number of rows equal to the number of Rx UE antennas and $X_{max}$ columns $X_{max}$ is determined by the maximum number of CSI-RS ports supported by the antenna array. The eNB can request that the UE to report the RSRP for the first X antennas where X=1, 2, . . . , $X_{max}$. The UE may then compute the RSRP for the first X ports of the configured $X_{max}$ ports CSI-RS resources in order to derive a virtualized RSRP.

For each antenna subset with X antennas (X=1, 2, . . . , $X_{max}$), the UE can reuse codebooks, such as rank 1 codebooks, for X transmit antennas to derive the best beamforming weight in terms of maximizing the virtualized RSRP. In one embodiment, an interference mitigation technique, such as codebook subset restriction, can be applied in a vertical feedback. In another embodiment, some codewords may be disabled by the eNB. A new codebook with only DFT vectors can be easily defined for X antennas as: $W_{X,l}=[w_{1,l}, w_{2,l}, \ldots, w_{X,l}]^T$ and $$\omega_{n,l} = \frac{1}{\sqrt{X}} \exp\left(2\pi \frac{i \cdot (n-1) \cdot l}{Q_X}\right),$$

n=1, 2, . . . X, l=0, 1, . . . $Q_X$–1 where $Q_X$ is the number of DFT vectors in the codebook for X antennas.

In one embodiment, a UE can measure the RSRP and/or the RSRQ for multiple cells. The cellular network can then determine which cell to use based on the feedback from the UE. For an antenna subset with the a first X antennas, the RSRP can be computed for the effective channel after beamforming $\tilde{H}_X = H_X W_{X, l_{max}}$, where $l_{max}$ corresponds to the DFT vector providing the highest closed-loop RSRP for the antenna subset with the first consecutive X antennas in the configured CSI-RS pattern.

In one embodiment, the UE can measure the CSI from one reference signal for open loop beamforming or closed-loop beamforming. In one embodiment, open loop beamforming can be used. For example, open loop beamforming can be used for a downlink transmission mode 3 (TM3). In open loop beamforming, the UE can report the CSI to the eNB, where the eNB applies different precoders for each resource element. In another embodiment, closed-loop beamforming can be used. In closed-loop beamforming, such as transmission mode 4 (TM4), the UE can report the CSI to the eNB, and the eNB can select precoders for beamforming that will result in a desired or optimal spectrum efficiency.

In one embodiment, where the UE uses closed-loop MIMO operation to define UE-specific cells, the eNB can configure the UE with one CSI-RS pattern with $X_{max}$ antenna elements. In one example, for a 3GPP LTE Rel. 10 cellular network having an antenna column with 7 antennas and where the numbers of CSI-RS ports supported by the eNB are 1, 2, 4, and 8, $X_{max}$ may be 1, or 2, or 4. The eNB may use consecutive $X_{max}$ antenna elements with the same polarization in one column, as in FIGS. 1 and 2, for the $X_{max}$ CSI-RS ports.

In one embodiment, a configured multi-port CSI-RS pattern is used by the UE to measure a channel matrix. For example, where the eNB has 4 antenna columns and each antenna column has 8 antenna elements, a multi-port CSI-RS pattern is used to convey the CSI information of one column of 8 antenna elements in the 2D antenna array. In this example, after the UE reports a closed-loop RSRP, the eNB then uses the recommend or selected optimum precoder to beamform the antenna elements of the 4 antenna columns to create a 4 port CSI-RS pattern. The UE will then report a selected or optimal CSI for the 4 ports CSI-RS pattern to the eNB.

For the eNB to vary the vertical beamforming, the eNB can vary the number of the antenna elements doing the vertical beamforming or vary the beamforming weights of the antenna elements. In one embodiment, when an eNB has 4 columns of antenna elements and each column has 8 antenna elements, then the eNB can be configured to beamform each antenna column to create a 4 port CSI-RS. When the 4 port CSI-RS is created, the UE can send a CSI or feedback report for the 4 port CSI-RS to the eNB. In another embodiment, the eNB can beamform 4 antenna elements out of 8 antenna elements in each antenna column to create one 8 port CSI-RS pattern. In this embodiment, the UE can send a CSI or feedback report for the 8 port CSI-RS pattern. In this example, when the eNB maps one column of 8 antenna elements to one UE to report a closed-loop RSRP, the eNB can instruct the UE to report selected or optimal precoders for the first 4 antenna elements and additionally report selected or optimal precoders for 8 antenna elements.

In one embodiment, the UE can communicate multiple RSRP reports per configured CSI-RS pattern to the eNB. In this embodiment, each RSRP report can have a different number of antenna elements used to derive the beamformed RSRP. In another embodiment, the UE can report the highest RSRP for a configured CSI-RS pattern and the selected number of antenna elements delivering the highest RSRP. In another embodiment, the UE can report the recommended beamforming weight index used to derive the beamformed RSRP.

For one embodiment, the CSI-RS ports or antenna ports may be beamformed such that each port corresponds to a different vertical beam pattern. One advantage of performing beamforming such that each port corresponds to a different vertical beam pattern is the reduction in feedback overhead. In another embodiment, the UE can feedback the beamforming weight index and RSRP of a preferred beam. One advantage of the UE providing feedback for the beamforming weight index and RSRP of a preferred beam is the additional saving of feedback overhead of vertical beamforming weights.

FIG. 7 depicts a main lobe and side lobes for a combined array gain with a selected number of antennas. In FIG. 7, the main lobe width and side lobe widths can be controlled by parameter X, which is the number of antenna elements used to create one virtual antenna port. Furthermore, as the number of antenna elements increases, e.g. 10, the antenna gain of the main lobe increases but the number of side lobes also increases. Similarly, if the number of antenna elements is small, e.g. 1, the number of side lobes is small but the antenna gain of the main lobe is also small. In one embodiment, the antenna gain and direction of the main lobe and nulls between the lobes can be used to improve the coverage and reduce interference. For example, the main lobe and nulls can be changed by varying the number of antennas that are used to form the antenna port. The UE may be better served with different X values depending on UE's elevation angle.

In one embodiment, different UE specific cells can be defined by changing radiation patterns via selecting the number of antenna elements, X, used to create one antenna port and/or changing the electrical tilting of the antenna elements. In another embodiment, different UE specific cells can be defined by changing radiation patterns via selecting the number of antenna elements, X, and selecting the beamforming weights to improve the coverage and reduce interference.

Figure 8:
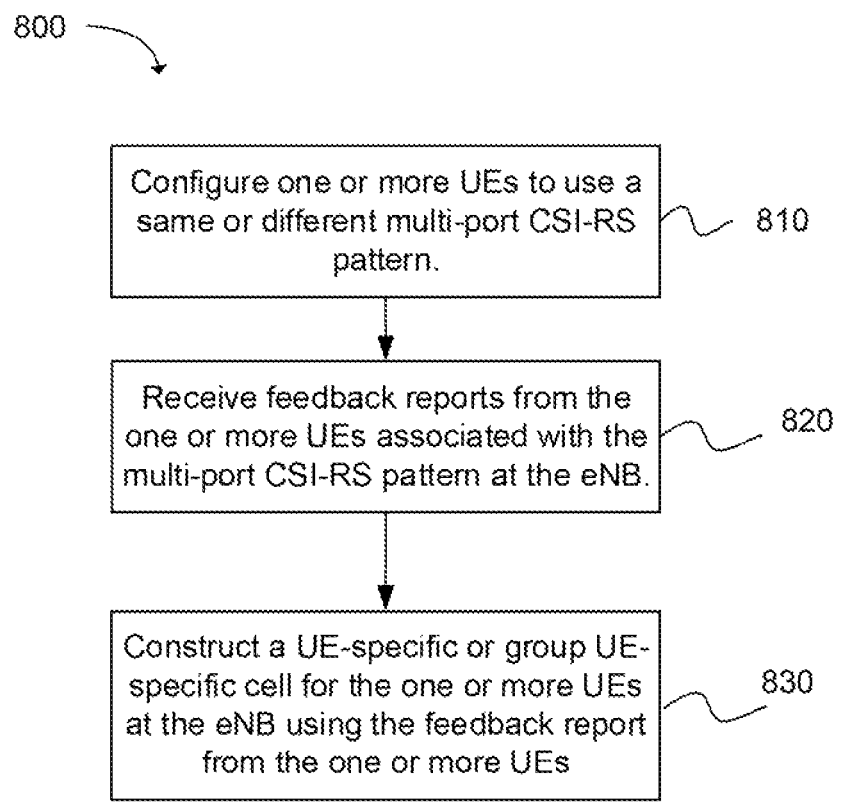
FIG. 8 depicts the functionality of the computer circuitry of an eNB operable to perform beamforming using multiple-input multiple-output (MIMO) in a cellular network in accordance with an example.

FIG. 8 provides a flow chart 800 to illustrate the functionality of one embodiment of computer circuitry of an eNB operable to perform beamforming using multiple-input multiple-output (MIMO) in a cellular network. The functionality can be implemented as a method or the functionality can be executed as instructions on a machine, where the instructions are included on at least one computer readable medium or one non-transitory machine readable storage medium. The computer circuitry can be operable to configure one or more UEs to use a same or different multi-port CSI-RS pattern, as in block 810. The computer circuitry can be further configured to receive feedback reports from the one or more UEs associated with the multi-port CSI-RS pattern at the eNB, as in block 820. The computer circuitry can also be configured to construct a UE-specific or group UE-specific cell for the one or more UEs at the eNB using the feedback report from the one or more UEs, as in block 830.

In one embodiment, the computer circuitry is further configured to make multiple antenna ports visible to the one or more UEs to enable the one or more UEs to receive the multi-port CSI-RS pattern. The computer circuitry can be further configured to make the multiple antenna ports visible to the one or more UEs by sending the one or more UEs a radio resource control (RRC) configuration message describing the CSI-RS pattern. The RRC configuration message can indicate a number of antenna ports available, a resource element position, or a CSI-RS to physical downlink shared channel (PDSCH) energy per resource element (EPRE) ratio.

In another embodiment, the computer circuitry is further configured to receive a feedback report that includes at least one of a reference signal received power (RSRP) report or a reference signal received quality (RSRQ) report. In another embodiment, the computer circuitry is further configured to beamform using a 3D MIMO or a FD MIMO with a 2D antenna array. In another embodiment, the computer circuitry is further configured to form a virtual UE-specific or a virtual group UE-specific cell comprising of at least one virtual antenna port. In one embodiment, the computer circuitry is further configured to associate with a plurality of antenna elements in a 2D antenna array.

In one embodiment, the computer circuitry is further configured to construct the UE specific or group UE-specific cell to form a desired radiation pattern by changing a number of antenna elements used in the virtual antenna port or changing an electrical tilting level of the virtual antenna port by adjusting the beamforming weight on each antenna element of the virtual antenna port in the 2D antenna array based on the feedback report from the one or more UEs. In another embodiment, the computer circuitry is further configured to configure the one or more UEs using the CSI-RS pattern with $X_{max}$ antenna elements, wherein $X_{max}$ is selected based on a maximum number of CSI-RS ports that is less than or equal to a selected number of antenna elements in the 2D antenna array.

In one embodiment, the computer circuitry is further configured to use consecutive $X_{max}$ antenna elements with a same polarization in a column of the 2D antenna array for the maximum number of CSI-RS ports. In another embodiment, the computer circuitry is further configured to adjust a vertical beamforming portion of the 3D beamforming or FD beamforming, wherein the computer circuitry adjusts the vertical beamforming portion by changing a number of the antenna elements for the vertical beamforming portion or changing a beamforming weight of at least one of the antenna elements based on the feedback report from the one or more UEs that is associated with the multi-port CSI-RS pattern.

Figure 9:
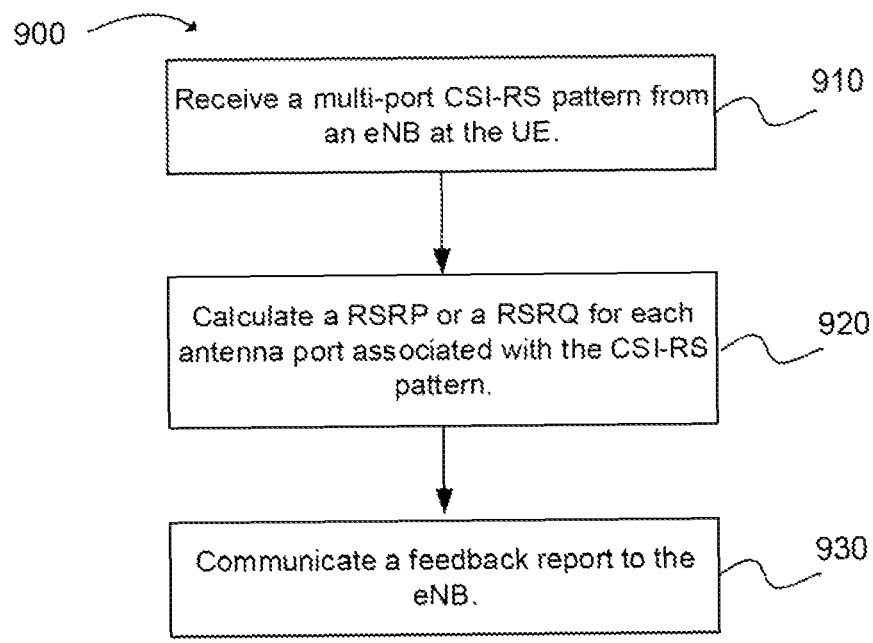
FIG. 9 depicts the functionality of the computer circuitry of a UE operable to communicate in a MIMO cellular network in accordance with an example.

FIG. 9 provides a flow chart 900 to illustrate the functionality of one embodiment of computer circuitry of a UE operable to communicate in a MIMO cellular network. The functionality can be implemented as a method or the functionality can be executed as instructions on a machine, where the instructions are included on at least one computer readable medium or one non-transitory machine readable storage medium. The computer circuitry can be configured to receive a multiple port (multi-port) channel state information reference signal (CSI-RS) pattern from an enhanced node B (eNB) at the UE, wherein the multi-port CSI-RS pattern is associated with multiple antenna ports, as in block 910. The computer circuitry can be further configured to calculate a reference signal received power (RSRP) or a reference signal received quality (RSRQ) for each antenna port associated with the CSI-RS pattern, as in block 920. The computer circuitry can also be configured to communicate a feedback report to the eNB, wherein the feedback report includes the RSRP or the RSRQ for each antenna port, as in block 930.

In one embodiment, the computer circuitry is further configured to select an antenna port having a highest received power or a highest received quality and provide feedback to the eNB of the selected antenna port. In another embodiment, the computer circuitry configured to receive the multi-port CSI-RS pattern is further configured to receive the multi-port CSI-RS pattern for the multiple antenna ports, wherein the multiple antenna ports are associated with: multiple antennas in a 2D antenna array; each antenna in a column of the 2D antenna array; multiple antennas in the column of the 2D antenna array; multiple columns in the 2D antenna array; or each antenna in the 2D antenna array.

In one embodiment, the computer circuitry is further configured to use a codebook for X antennas to derive a beamforming weight for the X antennas, wherein X is a number of antennas associated with the multiple antenna ports. In another embodiment, the computer circuitry is further configured to use a codebook with only discrete Fourier transform (DFT) vectors for the X antennas, wherein the codebook is defined as $W_{X,l}=[w_{1,l}, w_{2,l}, \ldots, w_{X,l}]^T$ and $$w_{n,l} = \frac{1}{\sqrt{X}} \exp\left(2\pi i \cdot (n-1) \cdot \frac{d_v}{\lambda} \cdot \cos(\theta_{etilt})\right),$$

$n=1, 2, \ldots X, l=0, 1, \ldots Q_X-1$, wherein W is the beamforming vector which is used to create one virtual antenna port, w is the beamforming weight applied on each antenna element, T is a transpose operation, where X is the number of antennas elements mapped to one antenna port, where n is the index of an antenna element to map an antenna port, where l is the antenna port index for a beamformed multi-port CSI-RS pattern, where $Q_X$ is a number of antenna ports in the multi-port CSI-RS pattern, where $d_v$ is a vertical antenna element spacing, where λ is a wavelength, where $\theta_{etilt}$ is an electrical downtilt.

In another embodiment, the computer circuitry is further configured to select an antenna port by determining a greatest RSRP or a greatest RSRQ of the multiple antenna ports. In one embodiment, the computer circuitry is further configured to report a desired beamforming weight index for selected antenna elements in a 2D antenna array of the eNB. In another embodiment, the computer circuitry is further configured to communicate the feedback report to the eNB using a closed-loop MIMO. In another embodiment, the computer circuitry is further configured to receive a beamformed signal from a virtual UE-specific or group UE-specific cell based on closed-loop feedback from the UE to the eNB for the multiple antenna ports.

Figure 10:
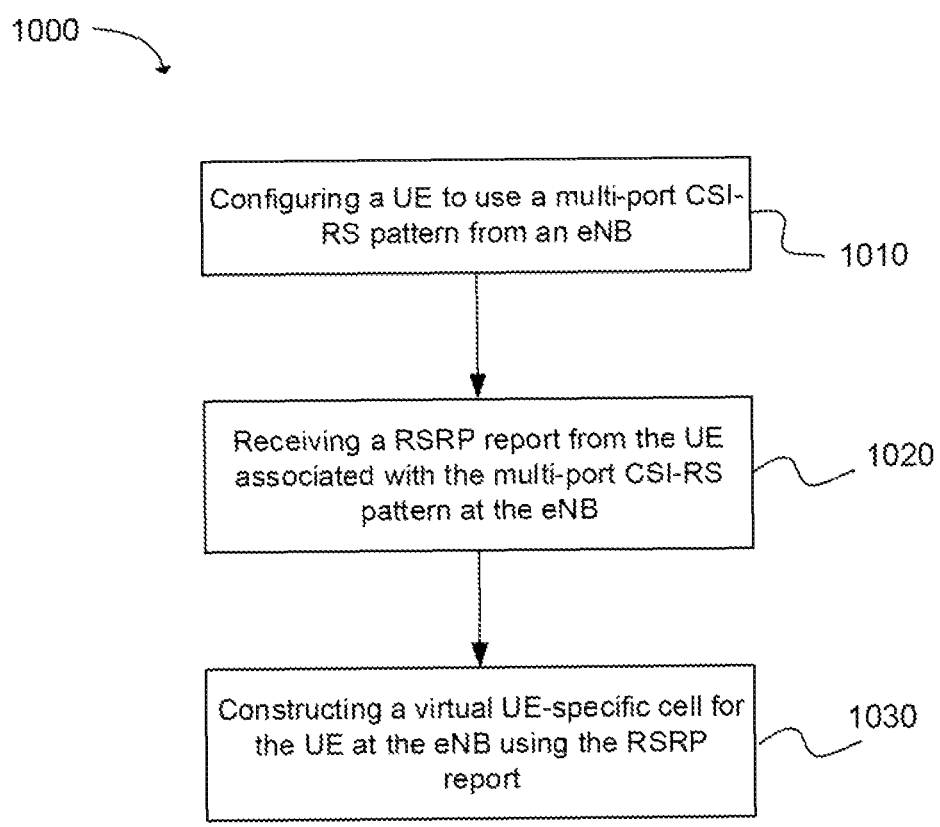
FIG. 10 illustrates a flow chart of a method for beamforming in a multiple-input and multiple-output (MIMO) cellular network in accordance with an example.

FIG. 10 provides a flow chart 1000 to illustrate a method for beamforming in a multiple-input and multiple-output (MIMO) cellular network. The method can comprise configuring a user equipment (UE) to use a multiple port (multi-port) channel state information reference signal (CSI-RS) pattern from an enhanced node B (eNB), wherein the multi-port CSI-RS pattern is associated with multiple antenna ports at the eNB, as in block 1010. The method can further comprise receiving a reference signal received power (RSRP) report from the UE associated with the multi-port CSI-RS pattern at the eNB, as in block 1020. The method can also comprise constructing a virtual UE-specific cell for the UE at the eNB using the RSRP report, as in block 1030. In one embodiment, the virtual UE-specific cell further comprises beamforming using a three dimensional (3D) MIMO or a full dimension (FD) MIMO with a 2D antenna array at the eNB. In another embodiment, the UE-specific or group UE-specific cell further comprises forming a virtual UE-specific cell comprising at least one virtual antenna port.

In one embodiment, the method further comprises associating the virtual antenna port with a plurality of antenna elements in a 2D antenna array. In another embodiment, the method further comprises configuring the UE using the CSI-RS pattern with $X_{max}$ antenna elements, wherein $X_{max}$ is selected based on a maximum number of CSI-RS antenna ports supported by an antenna array of the eNB. In another embodiment, the method further comprises using consecutive $X_{max}$ antenna elements with a same polarization in a column of the antenna array for the maximum number of CSI-RS antenna ports.

In one embodiment, the method further comprising selecting a defined number of antennas associated with an antenna port based on the feedback report from the UE. In another embodiment, the method further comprise beamforming by: adjusting an electrical tilt of one virtual antenna port by adjusting the beamforming weight of the antenna elements in an antenna column to map to the virtual antenna port; adjusting an antenna array tilt; or changing a number of antenna element that are used in each antenna column of a 2D antenna array.

Figure 11:
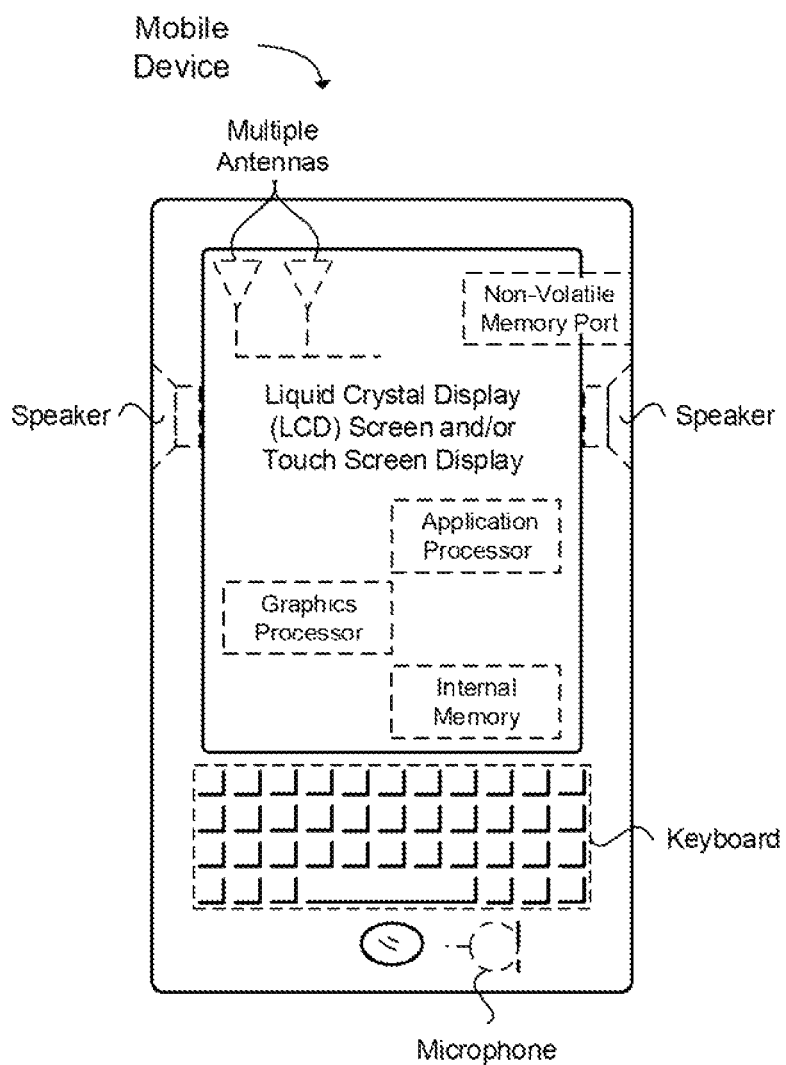
FIG. 11 illustrates a diagram of a UE in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An enhanced node B (eNB) operable to perform beamforming using multiple-input multiple-output (MIMO) in a cellular network, having computer circuitry configured to:
configure one or more user equipment (UEs) to use a same or different multiple port (multi-port) channel state information reference signal (CSI-RS) pattern;
receive feedback reports from the one or more UEs associated with the multi-port CSI-RS pattern at the eNB;
construct a UE-specific or group UE-specific cell for the one or more UEs at the eNB using the feedback report from the one or more UEs; and
select a defined number of antennas associated with an antenna port based on the feedback report from the one or more UEs.

2. The computer circuitry of claim 1, wherein the computer circuitry is further configured to make multiple antenna ports visible to the one or more UEs to enable the one or more UEs to receive the multi-port CSI-RS pattern.

3. The computer circuitry of claim 2, wherein the computer circuitry is further configured to make the multiple antenna ports visible to the one or more UEs by sending the one or more UEs a radio resource control (RRC) configuration message describing the CSI-RS pattern.

4. The computer circuitry of claim 3, wherein the RRC configuration message indicates a number of antenna ports available, a resource element position, or a CSI-RS to physical downlink shared channel (PDSCH) energy per resource element (EPRE) ratio.

5. The computer circuitry of claim 1, wherein the computer circuitry is further configured to receive a feedback report that includes at least one of a reference signal received power (RSRP) report or a reference signal received quality (RSRQ) report.

6. The computer circuitry of claim 1, wherein the computer circuitry is further configured to beamform using a three dimensional (3D) MIMO or a full dimension (FD) MIMO with a 2D antenna array.

7. The computer circuitry of claim 1, wherein the computer circuitry is further configured to form a virtual UE-specific or a virtual group UE-specific cell comprising at least one virtual antenna port.

8. The computer circuitry of claim 7, wherein the computer circuitry is further configured to associate one or more antenna ports with a plurality of antenna elements in a 2D antenna array.

9. The computer circuitry of claim 8, wherein the computer circuitry is further configured to construct the UE specific or group UE-specific cell to form a desired radiation pattern by changing a number of antenna elements used in the virtual antenna port or changing an electrical tilting level of the virtual antenna port by adjusting the beamforming weight on each antenna element of the virtual antenna port in the 2D antenna array based on the feedback report from the one or more UEs.

10. The computer circuitry of claim 8, wherein the computer circuitry is further configured to configure the one or more UEs using the CSI-RS pattern with $X_{max}$ antenna elements, wherein $X_{max}$ is selected based on a maximum number of CSI-RS ports that is less than or equal to a selected number of antenna elements in the 2D antenna array.

11. The computer circuitry of claim 10, wherein the computer circuitry is further configured to use consecutive $X_{max}$ antenna elements with a same polarization in a column of the 2D antenna array for the maximum number of CSI-RS ports.

12. The computer circuitry of claim 6, wherein the computer circuitry is further configured to adjust a vertical beamforming portion of the 3D beamforming or FD beamforming, wherein the computer circuitry adjusts the vertical beamforming portion by changing a number of the antenna elements for the vertical beamforming portion or changing a beamforming weight of at least one of the antenna elements based on the feedback report from the one or more UEs that is associated with the multi-port CSI-RS pattern.

13. A user equipment (UE) operable to communicate in a multiple-input multiple-output (MIMO) cellular network, having computer circuitry configured to:
receive a multiple port (multi-port) channel state information reference signal (CSI-RS) pattern from an enhanced node B (eNB) at the UE, wherein the multi-port CSI-RS pattern is associated with multiple antenna ports;
calculate a reference signal received power (RSRP) or a reference signal received quality (RSRQ) for each antenna port associated with the CSI-RS pattern;
communicate a feedback report to the eNB, wherein the feedback report includes the RSRP or the RSRQ for each antenna port, and
select a defined number of antennas associated with an antenna port based on the feedback report.

14. The computer circuitry of claim 13, wherein the computer circuitry is further configured to:
select an antenna port having a highest received power or a highest received quality; and
provide feedback to the eNB of the selected antenna port.

15. The computer circuitry of claim 13, wherein the computer circuitry configured to receive the multi-port CSI-RS pattern is further configured to receive the multi-port CSI-RS pattern for the multiple antenna ports, wherein the multiple antenna ports are associated with:
multiple antennas in a 2D antenna array;
each antenna in a column of the 2D antenna array;
multiple antennas in the column of the 2D antenna array;
multiple columns in the 2D antenna array; or
each antenna in the 2D antenna array.

16. The computer circuitry of claim 13, wherein the computer circuitry is further configured to use a codebook for X antennas to derive a beamforming weight for the X antennas, wherein X is a number of antennas associated with the multiple antenna ports.

17. The computer circuitry of claim 13, wherein the computer circuitry is further configured to use a codebook with only discrete Fourier transform (DFT) vectors for the X antennas, wherein the codebook is defined as:
$W_{X,l} = [w_{1,l}, w_{2,l}, \ldots, w_{X,l}]^T$ and $$w_{n,l} = \frac{1}{\sqrt{X}} \exp\left(2\pi i \cdot (n-1) \cdot \frac{d_v}{\lambda} \cdot \cos(\theta_{etilt})\right),$$

n=1, 2, ... X, l=0, 1, ... $Q_X$−1, wherein W is a beamforming vector which is used to create one virtual antenna port, w is a beamforming weight applied on each antenna element, T is a transpose operation, where X is a number of antennas elements mapped to one antenna port, where n is an index of an antenna element to map an antenna port, where l is an antenna port index for a beamformed multi-port CSI-RS pattern, where $Q_X$ is a number of antenna ports in the multi-port CSI-RS pattern, where d is a vertical antenna element spacing, where λ is a wavelength, and where $\theta_{etilt}$ is an electrical downtilt.

18. The computer circuitry of claim 14, wherein the computer circuitry is further configured to select an antenna port by determining a greatest RSRP or a greatest RSRQ of the multiple antenna ports.

19. The computer circuitry of claim 13, wherein the computer circuitry is further configured to report a desired beamforming weight index for selected antenna elements in a 2D antenna array of the eNB.

20. The computer circuitry of claim 13, wherein the computer circuitry is further configured to communicate the feedback report to the eNB using a closed-loop MIMO.

21. The computer circuitry of claim 13, wherein the computer circuitry is further configured to receive a beamformed signal from a virtual UE-specific or group UE-specific cell based on closed-loop feedback from the UE to the eNB for the multiple antenna ports.

22. A method for beamforming in a multiple-input and multiple-output (MIMO) cellular network, the method comprising:
configuring a user equipment (UE) to use a multiple port (multi-port) channel state information reference signal (CSI-RS) pattern from an enhanced node B (eNB), wherein the multi-port CSI-RS pattern is associated with multiple antenna ports at the eNB;
receiving a reference signal received power (RSRP) report from the UE associated with the multi-port CSI-RS pattern at the eNB;
constructing a virtual UE-specific cell for the UE at the eNB using the RSRP report; and
selecting a defined number of antennas associated with an antenna port based on the RSRP report from the UE.

23. The method of claim 22, wherein constructing the virtual UE-specific cell further comprises beamforming using a three dimensional (3D) MIMO or a full dimension (FD) MIMO with a 2D antenna array at the eNB.

24. The method of claim 22, wherein constructing the UE-specific or group UE-specific cell further comprises forming a virtual UE-specific cell comprising at least one virtual antenna port.

25. The method of claim 24, the method further comprising associating the virtual antenna port with a plurality of antenna elements in a 2D antenna array.

26. The method of claim 25, wherein the method further comprises configuring the UE using the CSI-RS pattern with $X_{max}$ antenna elements, wherein $X_{max}$ is selected based on a maximum number of CSI-RS antenna ports supported by an antenna array of the eNB.

27. The method of claim 26, the method further comprising using consecutive $X_{max}$ antenna elements with a same polarization in a column of the antenna array for the maximum number of CSI-RS antenna ports.

28. The method of claim 22, further comprising beamforming by:
adjusting an electrical tilt of one virtual antenna port by adjusting the beamforming weight of the antenna elements in an antenna column to map to the virtual antenna port;
adjusting an antenna array tilt; or
changing a number of antenna elements that are used in each antenna column of a 2D antenna array.

* * * * *